US009168893B1

(12) United States Patent
Schwartz

(10) Patent No.: US 9,168,893 B1
(45) Date of Patent: Oct. 27, 2015

(54) SYSTEM, METHOD, AND APPARTUS FOR REMOTELY DISABLING OR ENABLING A VEHICLE

(71) Applicant: Ituran USA, Ft. Lauderdale, FL (US)

(72) Inventor: Meir Schwartz, Coral Springs, FL (US)

(73) Assignee: ITURAN USA

( * ) Notice: Subject to any disclaimer, the term of this patent is extended or adjusted under 35 U.S.C. 154(b) by 0 days.

(21) Appl. No.: 14/483,794

(22) Filed: Sep. 11, 2014

Related U.S. Application Data

(60) Provisional application No. 61/982,682, filed on Apr. 22, 2014.

(51) Int. Cl.
*B60R 25/045* (2013.01)
*F02N 11/08* (2006.01)
*B60R 25/04* (2013.01)

(52) U.S. Cl.
CPC .......... *B60R 25/045* (2013.01); *F02N 11/0807* (2013.01); *B60R 2025/0405* (2013.01)

(58) Field of Classification Search
CPC ................... B60R 16/02; B60R 25/045; B60R 2025/0405; G06F 17/30; G06F 17/60; G07C 5/008; G08G 1/123; G08G 1/127; G08G 1/133; H04W 4/02; H04W 4/046; F02N 2300/30; F02N 2300/302; F02N 2300/304; F02N 2300/306; F02N 11/0807
See application file for complete search history.

(56) References Cited

U.S. PATENT DOCUMENTS

| 5,729,192 | A | 3/1998 | Badger |
| 6,091,340 | A * | 7/2000 | Lee et al. ........................ 340/5.6 |
| 6,195,648 | B1 | 2/2001 | Simon et al. |
| 6,552,648 | B1 * | 4/2003 | Rick et al. ........................ 340/5.1 |
| 6,664,888 | B1 | 12/2003 | Bishop et al. |
| 7,088,219 | B2 | 8/2006 | Dawson et al. |
| 8,160,616 | B2 | 4/2012 | Jain et al. |
| 2001/0040503 | A1 * | 11/2001 | Bishop .......................... 340/426 |
| 2002/0027501 | A1 | 3/2002 | Yamanaka et al. |
| 2002/0163450 | A1 * | 11/2002 | Flick ............................. 340/988 |
| 2004/0093291 | A1 * | 5/2004 | Bodin ............................. 705/35 |
| 2005/0033483 | A1 * | 2/2005 | Simon et al. ..................... 701/1 |

(Continued)

FOREIGN PATENT DOCUMENTS

GB 2305285 4/1997

OTHER PUBLICATIONS

Hoffman, Gary, "Car Payments Or Else: Engine Shut Off Systems", http://autos.aol.com/article/engine-shut-off-systems/, Jun. 27, 2009.

*Primary Examiner* — Jerrah Edwards
*Assistant Examiner* — Tamara Weber
(74) *Attorney, Agent, or Firm* — The Belles Group, P.C.

(57) ABSTRACT

A system, method, and apparatus for disabling and/or enabling a vehicle. In one embodiment, the invention can be a method for disabling and/or enabling a vehicle, the method comprising: receiving, with an electronic apparatus, a disable starter command, the electronic apparatus operably coupled to a starter circuit of the vehicle to enable and/or disable the starter circuit; the electronic apparatus disabling the starter circuit of the vehicle in response to the disable starter command; the electronic apparatus sending a test signal via a wireless network to a remote server when the vehicle is in a parked state and the starter circuit is disabled; and upon the electronic apparatus determining that the test signal was not successfully sent to the remote server, the electronic apparatus enabling the starter circuit of the vehicle.

20 Claims, 3 Drawing Sheets

(56) References Cited

U.S. PATENT DOCUMENTS

| | | | |
|---|---|---|---|
| 2005/0231335 A1* | 10/2005 | Miller et al. | 340/426.18 |
| 2005/0237167 A1* | 10/2005 | Hager | 340/426.15 |
| 2007/0136083 A1 | 6/2007 | Simon et al. | |
| 2011/0223880 A1 | 9/2011 | Lepejian et al. | |
| 2015/0088339 A1* | 3/2015 | Fisher | 701/2 |

* cited by examiner

SYSTEM, METHOD, AND APPARTUS FOR REMOTELY DISABLING OR ENABLING A VEHICLE

CROSS-REFERENCE TO RELATED APPLICATIONS

The present application claims priority to U.S. Provisional Patent Application No. 61/982,682, filed Apr. 22, 2014, the entirety of which is incorporated herein by reference.

BACKGROUND

The purchase of personal property, and specifically vehicles such as automobiles, motorcycles and boats, is generally accomplished by the consumer financing the purchase through a personal loan system. In such a circumstance, the purchaser borrows money from a financial or lending institution, takes title to the vehicle and pays the loan balance in monthly installments, which amortize the full amount of the loan. The financial institution typically retains a lien interest against the title of the vehicle and the loan is secured by a chattel mortgage thereon. Thus, the vehicle is used as collateral for the loan. The financial institution may confiscate or repossess the vehicle upon a default condition of the loan, as agreed to by the purchaser or as provided at law. Due to the mobile nature of a vehicle, however, it is often difficult for the financial institution to locate the vehicle for repossession. Further, when a purchaser of a vehicle knows he is in default of the loan, the purchaser will attempt to evade repossession by moving the vehicle to locations unbeknownst to the financial institution.

When a purchaser in default evades repossession of the vehicle, the repossession process can become costly for the financial or lending institution. The financial or lending institution may hire a third party repossession agent and/or an investigative service agency to assist in locating and recovering the vehicle.

Devices have been designed and deployed to assist financial or lending institutions with the repossession of personal property such as vehicles. Most of these devices are electronic devices that are affixed to the vehicle to act as a homing beacon or global positioning system (GPS) module. Thus, whenever vehicle repossession is deemed necessary, the homing device can be activated or the GPS module used to determine a present location of the collateral. This methodology is ineffective, however, if the purchaser of the vehicle frequently changes the location of the vehicle.

Further, devices have been designed to disable a vehicle whose owner has defaulted on a loan. These devices, however, do not take into sufficient consideration that a vehicle could be disabled in an area lacking cellular network coverage. For example, if a vehicle is moving in an area covered by a cellular network when its starter is disabled, the vehicle may not be stopped and disabled until it has moved into an area not covered by a cellular network. In this instance, the institution attempting to repossess the vehicle will have difficulty determining the vehicle's location. Further, if a loan payment is made on the disabled vehicle, the financial institution will have difficulty re-enabling the vehicle if it cannot utilize the wireless network.

Thus, a need exists for a system, method and/or apparatus to assist the financial or lending institution in repossessing a vehicle when the vehicle owner defaults on the loan payments. A need also exists for a system, method and/or apparatus for disabling and enabling a vehicle that takes into consideration the vehicle's access to a cellular network.

BRIEF SUMMARY

The present invention is directed to a method, system, and apparatus for disabling and enabling a vehicle. In one embodiment, the invention can be a method for disabling and/or enabling a vehicle, the method comprising: receiving, with an electronic apparatus, a disable starter command, the electronic apparatus operably coupled to a starter circuit of the vehicle to enable and/or disable the starter circuit; the electronic apparatus disabling the starter circuit of the vehicle in response to the disable starter command; the electronic apparatus sending a test signal via a wireless network to a remote server when the vehicle is in a parked state and the starter circuit is disabled; and upon the electronic apparatus determining that the test signal was not successfully sent to the remote server, the electronic apparatus enabling the starter circuit of the vehicle.

In another embodiment, the invention can be a method for disabling and/or enabling a vehicle, the method comprising: (a) receiving, with an electronic apparatus, a disable starter command, the electronic apparatus operably coupled to a starter circuit of the vehicle to enable and/or disable the starter circuit; (b) the electronic apparatus sending a test signal to a remote server via a wireless network when the vehicle is in a parked state, the test signal sent subsequent to the receipt of the disable starter command; and (c) upon the electronic apparatus determining that the test signal was not successfully sent to the remote server, the starter circuit remaining in or being returned to an enabled state.

In yet another embodiment, the invention can be a system for disabling and/or enabling a vehicle, the system comprising: a server configured to communicate with a remote computer, and an electronic apparatus configured to operably couple to a starter circuit of the vehicle to enable and/or disable the starter circuit; communicate with the server via a wireless network; receive a disable starter command; disable the starter circuit in response to the disable starter command; send a test signal to the remote server when the vehicle is in a parked state and the starter circuit is disabled; and upon determining that the test signal was not successfully sent to the remote server, enable the starter circuit of the vehicle.

In a further embodiment, the invention can be an electronic apparatus for disabling and/or enabling a vehicle, the apparatus comprising a switching mechanism configured (a) to operably couple to a starter circuit of the vehicle and (b) to disable and enable the starter circuit; a transceiver configured to receive wireless command signals from a remote server; and a processor operably coupled to the switching mechanism and the transceiver, the processor configured to instruct the switching mechanism to disable the starter circuit based on receipt of a starter disable command from the remote server; instruct the transceiver to send a test signal to the remote server when the vehicle is in a parked state and the starter circuit is disabled; determine whether the test signal was successfully sent to the remote server; and upon determining that the test signal was not successfully sent to the remote server, instruct the switching mechanism to enable the starter circuit.

Further areas of applicability of the present invention will become apparent from the detailed description provided hereinafter. It should be understood that the detailed description and specific examples, while indicating the preferred embodi-

BRIEF DESCRIPTION OF THE DRAWINGS

The present invention will become more fully understood from the detailed description and the accompanying drawings, wherein.

DETAILED DESCRIPTION

Figure 1:
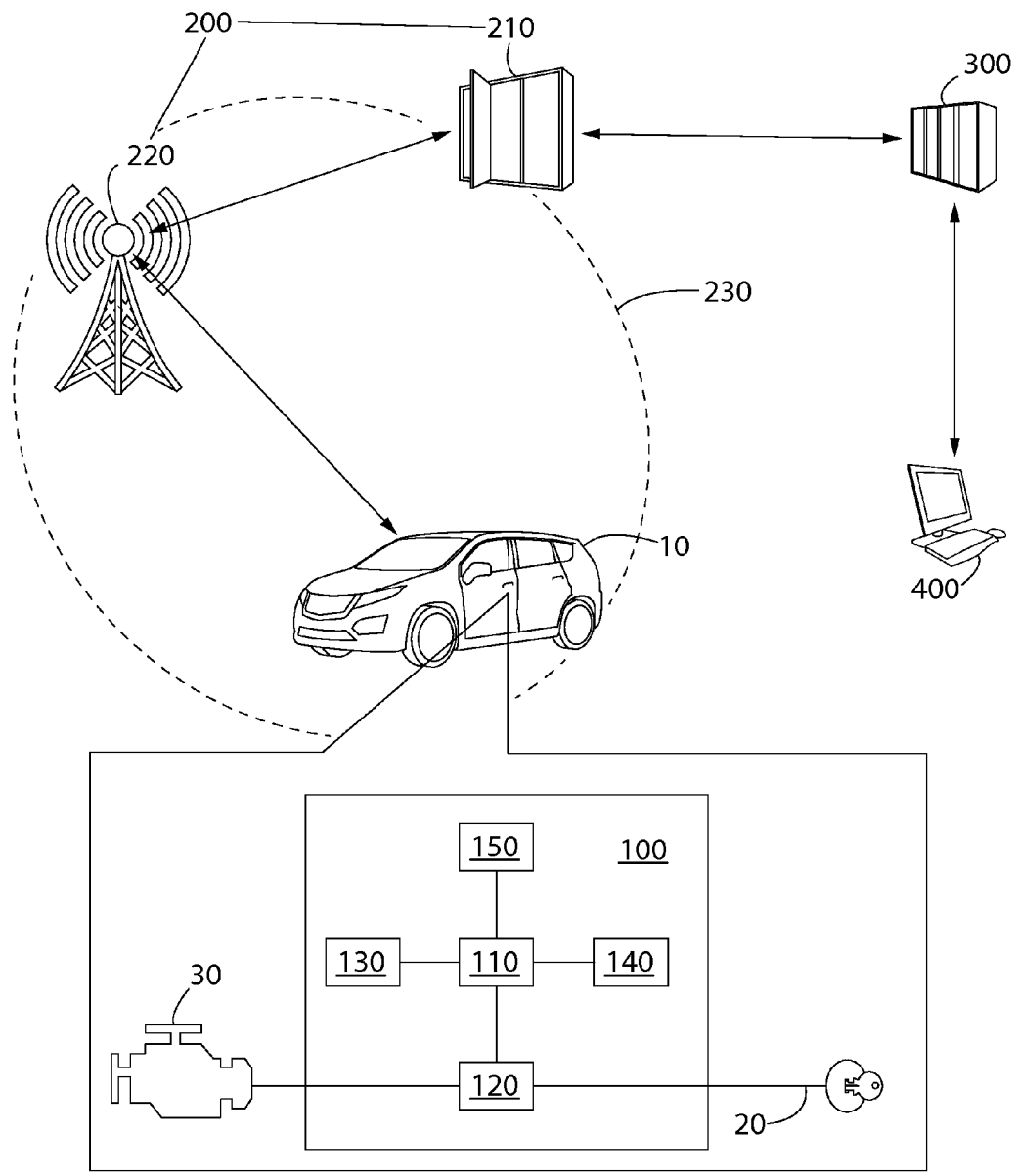
FIG. 1 is a schematic diagram of a system for disabling and/or enabling a vehicle in accordance with an embodiment of the invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of the exemplary embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," "secured" and similar refer to a relationship wherein structures are secured or attached to one another either directly or indirectly through intervening structures, as well as both movable or rigid attachments or relationships, unless expressly described otherwise. Moreover, the features and benefits of the invention are described by reference to the exemplary embodiments illustrated herein.

Accordingly, the invention expressly should not be limited to such exemplary embodiments, even if indicated as being preferred. The discussion herein describes and illustrates some possible non-limiting combinations of features that may exist alone or in other combinations of features. The scope of the invention is defined by the claims appended hereto.

FIG. 1 is a schematic diagram of a system for disabling and/or enabling a vehicle 10 in accordance with an embodiment of the invention. In the exemplified embodiment, the vehicle 10 is illustrated as a car. The invention is not to be so limited in all embodiments, however, as the vehicle 10 can, in certain embodiments, be any machine for carrying people or goods, including a truck, a motorcycle, a bicycle, a boat (including house boats), an airplane, a helicopter, a house trailer, a mobile home, a recreational vehicle, heavy machinery such as a tractor, or other farm equipment. In certain embodiments, the vehicle 10 can be any device that has mobility that a purchaser purchases through a loan with a lending institution regardless of whether or not the device can carry people or goods.

The exemplified system utilizes a dealer workstation 400, a service provider server 300 (also referred to herein as a remote server), a cellular network 200 (comprising a cellular network server 210 and a cellular network tower 220), and an electronic apparatus 100. These components are all in operable communication with one another so that signals and instructions can be transmitted from and between any of the various components. The dealer workstation 400 can be any type of computer or other processor that can communicate with other devices through the Internet, such as a desktop computer, a laptop, a tablet, a cellular phone such as a smartphone, a pager, or the like. In certain embodiments, the dealer workstation 400 is owned by the lending institution that has provided financing for the vehicle 10. However, the invention is not to be so limited and the dealer workstation 400 can be owned by a third party institution, local authorities, or any other person or corporation that is authorized to control the ability of the vehicle 10 to be operational.

In certain embodiments, signals are transmitted from the dealer workstation 400 to the electronic apparatus 100 (via the service provider server 300 and the cellular network 200) for instructing the electronic apparatus 100 to either enable or disable a motor 30 of the vehicle 10. The electronic apparatus 100 may then be able to transmit a signal back to the dealer workstation 400 (or to the service provider server 300) immediately upon receipt of the signals from the dealer workstation 400 or at a later time to confirm that the electronic apparatus 100 is located within an area 230 that is covered by the cellular network 200. The transmission of signals between the various components of the system and the purpose of the electronic apparatus 100 transmitting signals back to the dealer workstation 400 will be described in more detail below with reference to FIGS. 2 and 3.

The vehicle 10 comprises a starter circuit 20 and a motor 30. Of course, in the exemplified embodiment the vehicle 10 also comprises a body, wheels, an engine, headlights, doors, windows, and many other features that are standard in motorized vehicles, but which will not be described herein in detail. The electronic apparatus 100 is operably coupled to a starter circuit 20 of the vehicle 10 to enable and/or disable the vehicle 10. Specifically, in the exemplified embodiment the electronic apparatus 100 is operably coupled to the starter circuit 20 so as to be capable of opening a switch located between the starter circuit 20 and the motor so that the electronic apparatus 100 can prevent the motor 30 from operating when the switch is open and permit the motor 30 to operate when the switch is closed. Of course, the electronic apparatus 100 can be operably coupled to other features of the vehicle 10 (such as the brake switch, an engine sensor, the engine control unit, an OEM immobilizer, or the fuel system), so long as the electronic apparatus 100 is capable of enabling and disabling operation of the vehicle 20 in response to signals received from the dealer workstation 400 or service provider server 300, as discussed in more detail below. It should be appreciated that in certain embodiments disabling the vehicle 20 merely means that the vehicle is prohibited from being started or turned/powered on when in an "off" state, but that disabling the vehicle 20 will not turn/power off the vehicle 20 if it is already in an "on" state.

The electronic apparatus 100 includes a transceiver 150, a memory 140, a GPS module 130, a processor 110, and a switching mechanism 120 that are all operably coupled together. In the exemplified embodiment, the transceiver 150, the memory 140, the GPS module 130, and the switching mechanism 130 are all operably coupled to the processor 110 so that the processor 110 can process information obtained and stored in the other components to control operation of the electronic apparatus 100. The processor 110 may be any type of properly programmed processing device, such as a computer or microprocessor, configured for executing computer program instructions (e.g. code). The processor 110 may be embodied in computer and/or server hardware of any suitable type (e.g. desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc. The processor 110 is configured with specific algorithms to enable the electronic apparatus 100 to store and organize signals and data that are transmitted to the electronic apparatus 100 from the dealer workstation 400 (or from other workstations, computers, or the like). The processor 110 also enables the electronic apparatus 100 to perform all of the functions described herein below.

The transceiver 150 of the electronic apparatus 100 is capable of receiving signals transmitted from the dealer workstation 400 (or otherwise) and transmitting signals from the electronic apparatus 100 to the dealer workstation 400 (or to the service provider server 300 or elsewhere as desired). The memory 140 is capable of storing data related to signals received by the electronic apparatus 100 and other information as desired/required for proper functioning of the electronic apparatus 100. The GPS module 130 can be used as a location identification means for the vehicle 10 so that the geographic location of the vehicle 10 can be tracked by a lending institution or other organizations are desired. The switching mechanism 120 is the mechanism that is configured to transition the vehicle 10 between being enabled and being disabled, by, in the exemplified embodiment, opening a switch located between the starter circuit 20 and the motor 30. Of course, as noted above the switching mechanism 120 can be positioned at other locations while still being capable of performing its functions noted herein below. The switching mechanism 120 can be any mechanism capable of transitioning the vehicle 10 between being enabled and disabled.

The electronic apparatus 100 can consist of a single module within a single housing designed for electrical connection to the starter circuit 20 and motor 30 of the vehicle 10. Thus, in certain embodiments each of the transceiver 150, the memory 140, the GPS module 130, the processor 110, and the switching mechanism 120 may be located within a single housing. Alternatively, the components of the electronic apparatus 100 can be located in different housings, or some components can be outside of the housing. For example, in one embodiment the switching mechanism 120 can be located within a main body of the electronic apparatus 100 along with the other components of the electronic apparatus 100. In another embodiment, the switching mechanism 120 can be located outside the main body, but still be operably coupled to an output of the main body. In the latter example, the switching mechanism 120 can be activated via an output terminal of the main body of the electronic apparatus 100. Further, the electronic apparatus 100 can include various components of the vehicle 10, including portions of the vehicle circuitry or the vehicle antenna.

The electronic apparatus 100 can be bought by a car dealer or finance company or other establishment financing or otherwise enabling the purchase of the vehicle 10. The apparatus 100 can be installed in a purchased vehicle 10 as a condition for loan approval or purchase. The loan or sale agreement can be structured such that the vehicle 10 can be repossessed in the event of default, with the electronic apparatus 100 assisting in the disabling and locating of the vehicle 10. Disabling the vehicle 10 makes repossession easier, since the vehicle 10 can no longer move. Further, if the car is disabled, the owner is likely to promptly post a payment. If payments for the vehicle 10 are made up to date, the starter circuit 20 can be re-enabled by an enable starter command that is transmitted from the dealer workstation 400 or otherwise to the electronic apparatus 100. The invention is not limited to car dealers or financial institutions, however, as the apparatus 100 can be utilized by any entity given authority to disable or enable a vehicle.

Figure 2:
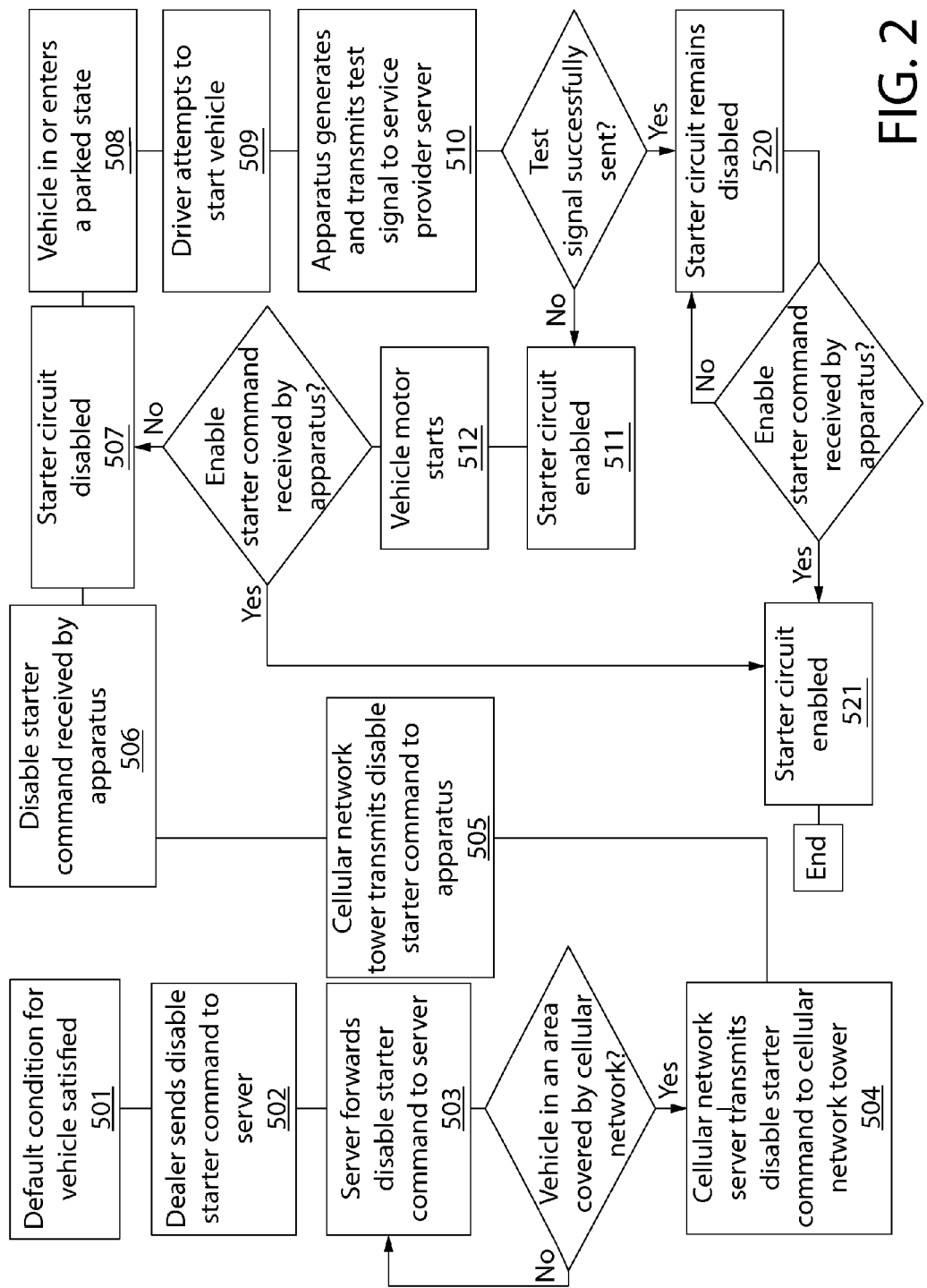
FIG. 2 is a flow chart for a method of disabling and/or enabling a vehicle that prevents the vehicle from being disabled when the vehicle is parked in an area where cellular coverage is not available in accordance with an embodiment of the invention.

FIG. 2 is a flow chart for a method of disabling and/or enabling a vehicle that prevents the vehicle from being disabled when the vehicle is parked in an area where cellular coverage is not available in accordance with a first embodiment of the present invention. Referring to FIGS. 1 and 2 concurrently, this first embodiment of the present invention will be described in detail. According to this method, a condition placing the vehicle 10 owner in default is first satisfied (step 501). As discussed above, a condition placing the vehicle 10 owner in default can include failure to make a loan payment, with the dealer being a car dealer or financial institution that provided a loan for purchase of the car. The invention is not so limited, however, as a disable starter command (discussed in more detail below) can be sent by any person or entity given authority to enable or disable the vehicle 10, such as law enforcement or a guardian. Thus, the disable starter command can be sent for many reasons in addition to failure to make a loan payment, for example, fraud, misconduct, criminal acts/being wanted by the police, the user of the vehicle 10 lacking mental capacity to operate the vehicle 10, or the like. Based on the default condition being satisfied, a dealer at the dealer workstation 400 (which can be any of the persons or entities noted herein) sends a disable starter command to the service provider server 300 (step 502). This disable starter command, when eventually received by the electronic apparatus 100 as discussed herein below, includes instructions that, when processed by the processor 110 of the electronic apparatus 100, causes the electronic apparatus 100 to disable operation of the vehicle 10.

In one embodiment the service provider server 300 is controlled by the same entity that provides the electronic apparatus 100, the electronic apparatus 100 and the network functionality of the service provider server 300 forming two components of a vehicle disabling and enabling service. But in alternative embodiments the service provider server 300 can be any computer or computing device that responds to requests across a computer network and need not be controlled by the company providing the electronic apparatus 100.

Once it receives the disable starter command, the service provider server 300 processes the command and forwards it to the cellular network server 210 (step 503). In other embodiments, the command can be sent directly from the originator of the command to the cellular network server 210. In other embodiments, the service provider server 300 or dealer workstation 400 can bypass the cellular network 200 by using an alternative wireless technology (radio or the like).

In this embodiment, if the vehicle 10 is in an area not covered by the cellular network 200, the disable starter command cannot be forwarded to the electronic apparatus 100. Thus, after the service provider server 300 forwards the disable starter command to the cellular network server 300 at step 503, a determination is made regarding whether the vehicle 10 is in an area that is covered by the cellular network 200 (i.e., area 230 illustrated in FIG. 1). If the vehicle 10 is not in the area 230 covered by the cellular network 200 (i.e., if the vehicle 10 in FIG. 1 is located external to the circle denoting the area 230), the command is re-forwarded until successfully transmitted. The invention can be configured to cease forwarding the command after a predetermined number of attempts or after a predetermined period of time has elapsed or based on any other conditions commonly known in the art. Further, the command can be programmed to re-send but only after a predetermined period of time has elapsed. In other embodiments, the invention can omit re-forwarding and simply notify the dealer workstation 400 of the failed attempt so that the dealer or other person at the dealer workstation 400 can resend the disable starter command as desired.

If the vehicle 10 is in the area 230 covered by the cellular network 200 (as depicted in FIG. 1), then the method continues to the next step. Specifically, at step 504, after it has been determined that the vehicle is in the area 230 covered by the cellular network 200, the cellular network server 210 locates the cellular network tower 220 in contact with the electronic apparatus 100 and transmits the disable starter command to the cellular network tower 220 (step 504).

Next, the cellular network tower 220 transmits the disable starter command to the electronic apparatus 100 that is coupled to the starter circuit 20 of the vehicle 10 (step 505). The electronic apparatus 100 receives the disable starter command (step 506) and the starter circuit 20 is disabled (step 507). As discussed in more detail below, this disabling of the starter circuit 20 at step 507 may be considered a temporary disabling that can be overridden depending on whether the vehicle 10 ends up being parked in an area covered by a cellular network, with the permanent disabling taking place at step 520 only when the vehicle 10 is parked in an area covered by the cellular network.

After the starter circuit 20 is disabled at step 507, the electronic apparatus 100 may send an acknowledge message to the dealer workstation 400 confirming receipt of the disable starter command, the acknowledge message utilizing the aforementioned cellular network tower 220, cellular network server 210, and service provider server 300. In other embodiments, the electronic apparatus 100 can use an alternative wireless network 200 to communicate with the dealer workstation 400.

In the exemplified embodiment the electronic apparatus 100 disables the starter circuit 20 of the vehicle 10 by use of a switching mechanism 120 operably coupled to the starter circuit 20. In this embodiment, the switching mechanism 120 is a relay, which is an electrically operated switch. Of course, the invention is not to be so limited in all embodiments and the switching mechanism 120 can be any component that is capable of transitioning the vehicle 10 between a disabled state and an enabled state (i.e., a component that can disable operation of the vehicle 10 upon receipt of the disable starter command and then re-enable operation of the vehicle 10 upon receipt of an enable starter command, discussed in more detail below). When the disable starter command is received by the electronic apparatus 100, the electronic apparatus 100 activates or instructs the switching mechanism 120 to disable the starter circuit 20. Specifically, in the exemplified embodiment the switching mechanism 120 disconnects the starter circuit 20 from the motor 30 by opening a switch between the starter circuit 20 and the motor 30 such that the starter cannot start the motor 30. As noted above, other mechanisms can be used for disabling the vehicle 10 as discussed herein and otherwise well known by persons of ordinary skill in the art.

The motor 30 can be any machine supplying motive power for a vehicle 10, including an automobile engine. The starter circuit 20 can be any electrical circuit that enables the motor 30 to start. For example, if the motor 30 is a standard internal-combustion engine, the starter circuit 20 can be designed to cause the starter to rotate the engine in response to a user inserting a key into an ignition of the vehicle 10 and turning the key, thereby enabling the engine to operate under its own power. Under normal circumstances, the starter circuit 20 can receive a charge from the vehicle battery and send the charge to an alternator to enable the vehicle 10 to start. The invention, however, is not so limited. The invention can utilize any type of switching mechanism 120 capable of enabling or disabling the vehicle 10, including (but not limited to) a mechanism capable of enabling or disabling an electrical connection between two devices by closing and opening a circuit or using other techniques.

As noted herein, in the exemplified embodiment the disable starter command interrupts the starter circuit 20 and not the motor 30. Therefore, even after the vehicle 10 has been disabled by opening a switch located between the starter circuit 20 and the motor 30 or within the starter circuit 20 itself, the vehicle 10 will keep running and will not be fully disabled until the vehicle 10 is turned off. This is because the electronic apparatus 100 only prevents the vehicle 10 from being restarted, it does not actually shut the vehicle 10 down when the vehicle 10 is already powered on and operating. As a result of this, if the vehicle receives the disable starter command when it is in the area 230 covered by the cellular network 200, but then drives to a location outside of the area 230 covered by the cellular network 200 (and outside of any area covered by any cellular network), the vehicle 10 will not be able to be restored to operation even if an enable starter command is sent to the electronic apparatus 100. Specifically, if the vehicle 10 that has previously been disabled as noted above is later stopped/parked outside of the area 230 covered by the cellular network 200 (and all other cellular networks), the vehicle 10 will not be able to receive an enable starter command and will not be able to be located using the cellular network. Thus, in this situation even if the user later remedies the default condition, the lending institution or other operator of the workstation 400 will not be able to wirelessly enable the vehicle 20 to allow the vehicle 20 to be restarted. This may require the lending institution or other operator of the workstation 400 to have to physically appear at the location of the vehicle 10 in order to enable the user who is no longer in default to use the vehicle 10, which is time consuming and highly undesirable. The exemplified method provides a means for avoiding this scenario.

The disabling of the starter circuit (step 507) may occur while the motor 30 of the vehicle 10 is on or while the vehicle 10 is in a parked state. The entity transmitting the disable start command may not know whether or not the vehicle 10 is in motion or parked. Thus, at the time of disabling, the vehicle 10 is either already in a parked state, or the vehicle 10 will subsequently enter into a parked state (step 508). As noted above, the vehicle 10 is fully operable until the vehicle 10 enters the parked state (if it was powered on at the time that the starter circuit 20 is disabled) even after the starter circuit is disabled at step 507. The parked state is achieved by the vehicle 10 being powered off with the motor 30 turned off. Thus, the parked state is not achieved simply by placing the vehicle into park, but rather requires that the motor 30 be powered off. Furthermore, in certain embodiments the electronic apparatus 100 can be programmed to recognize a parked state when the vehicle 10 has been parked with the motor 30 powered off for a pre-determined period of time, such as 30 seconds, one minute, two minutes, five minutes, ten minutes, thirty minutes, or the like. This prevents the vehicle 10 from being considered in a parked state when the motor 30 has been off for only a brief period of time, for example, if the motor 30 temporarily stopped while the vehicle 10 was in traffic or the transmission was stalling, which could otherwise result in a dangerous situation for the operator of the vehicle 20.

When in a parked state, the driver/owner of the vehicle 10 will eventually attempt to restart the vehicle 10 (by turning the ignition key or by a comparable method) (step 509). In the exemplified embodiment, when this attempt is made the electronic apparatus 100 generates and transmits a test signal to the service provider server 300 (step 510). The test signal is sent in order to determine whether the vehicle 10 is located within the area 230 covered by the cellular network 200 (or covered by any cellular network) at the time that an attempt to re-start the vehicle 10 is being made. Specifically, if the vehicle 10 is not located within the area 230 covered by the cellular network 200, it may not be desirable to fully disable the vehicle 10 because it will then not be possible to wirelessly re-enable the vehicle. However, if the vehicle 10 is located within the area 230 covered by the cellular network 200, it will be determined that fully disabling the vehicle 10 is appropriate because the vehicle 10 will be able to be re-enabled wirelessly if the default condition is remedied.

Therefore, if the test signal is successfully sent to the service provider server 300, which would indicate that the vehicle 10 is located within the area 230 covered by the cellular network 200, the starter circuit 20 will remain disabled (step 520). As noted above, the successful transmission of the test signal to the service provider server 300 confirms that the starter circuit 20 is disabled in an area 230 covered by the cellular network 200, and therefore the vehicle 10 can be easily located. It further confirms that the vehicle 10 can receive an enable starter command.

Thus, after the starter circuit 20 is determined to remain disabled at step 520, the starter circuit 20 will remain disabled until a enable starter command is received by the electronic apparatus 100. The enable starter command may be sent by the workstation 400 upon the default condition that led to the starter circuit 20 being disabled being remedied, such as by the user or owner of the vehicle 10 making a past due loan payment or the like. The enable starter command can be any command, signal, message, or other communication instructing the electronic apparatus 100 to re-enable the starter circuit 20. The enable starter command can instruct the electronic apparatus 100 to enable the starter circuit 20 by closing a switch or otherwise reversing or canceling the disable starter command. If such a command is received the starter circuit 20 can be re-enabled (step 521) and the vehicle 10 can again be started and used.

If the test signal is not sent successfully to the server 300, then the vehicle 10 may be located in an area not covered by the cellular network 200. In this circumstance, the electronic apparatus 100 re-enables the starter circuit 20 (step 511) to allow the vehicle 10 to start again (step 512). Thus, in this circumstance the disable starter command remains stored in the internal memory 120 of the electronic apparatus 100 so that another attempt to disable the vehicle 10 can be made when the vehicle 10 is parked again (hopefully at a different location). Specifically, the electronic apparatus 100 can save data in its internal memory 140 to create a record of the failed (or successful) transmission of the test signal. This stored data can indicate to the electronic apparatus 100 that the starter circuit 20 should be disabled again at a later time. Thus, the disabling of the starter circuit 20 at step 507 may be considered a temporary disabling that is only made permanent after the vehicle 10 is in a parked state, and after the test signal is successfully transmitted to the server 300. If the test signal is not successfully transmitted to the server 300, the temporary disabling of the starter circuit 20 will be reversed by the electronic apparatus 100 so that the vehicle will not be fully disabled at that particular location.

If at any time the electronic apparatus 100 receives an enable starter command (due to the user or owner of the vehicle 10 remedying the default condition by paying the loan payment or the like), the starter circuit is re-enabled (step 521) and the vehicle motor 30 can start. Thus, this can occur even after the test signal is not successfully sent if the default condition is later remedied. If, however, the electronic apparatus 100 does not receive an enable starter command, the starter circuit 20 is again disabled (step 507), in the temporary sense noted above, after the user starts the motor 30 at step 512. When the vehicle motor 30 is later stopped, presumably in a new location (though not necessarily), the vehicle 10 is considered to be in a subsequent parked state (step 508). As with the parked state, the subsequent parked state can be considered to occur when the motor 30 is off for a predetermined period of time. When the driver next attempts to start the vehicle 10 (step 509), the electronic apparatus 100 once again transmits a test signal to the server 300 (step 510) and the above steps are repeated to determine whether the vehicle 10 has been disabled in an area 230 covered by the cellular network 200. Upon the electronic apparatus 100 determining that the re-sent test signal was successfully sent to the remote server 300, the electronic apparatus 100 can disable the starter circuit 20 of the vehicle 10 (step 520). If the disable starter command is still active (has not been cancelled or overridden, for example, by an enable starter command), the electronic apparatus 100 can continue to resend a test signal every time there is an attempt to start the vehicle 10 from a parked state until determining that the test signal was successfully sent to the remote server 300, at which time the starter circuit 20 can remain disabled (step 520).

Figure 3:
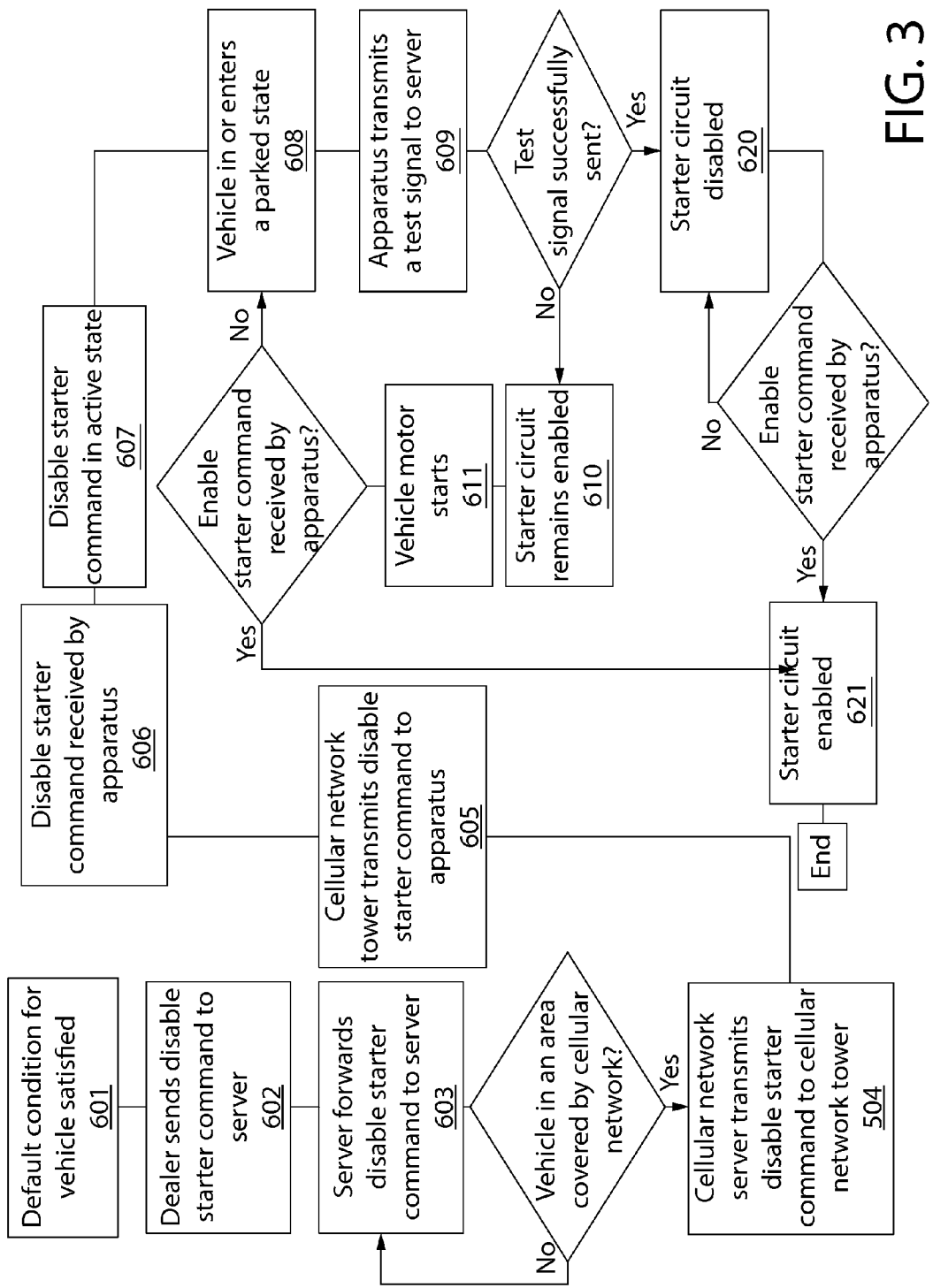
FIG. 3 is a flow chart for a method of disabling and/or enabling a vehicle that prevents the vehicle from being disabled when the vehicle is parked in an area where cellular coverage is not available in accordance with an alternative embodiment of the invention.

FIG. 3 is a flow chart for a method of disabling and/or enabling a vehicle 10 that prevents the vehicle 10 from being disabled when the vehicle is parked in an area where cellular coverage is not available in accordance with an alternative embodiment of the invention. Referring to FIGS. 1 and 3 concurrently, this second embodiment of the present invention will be described in detail. Similar to the previously discussed embodiment, when a default condition is satisfied (step 601) such as by the owner of the vehicle 10 failing to make a timely loan payment, the dealer workstation 400 sends a disable starter command to the service provider server 300 (step 602), and the service provider server 300 forwards the disable starter command to the cellular network server 210 (step 603). If the vehicle 10 is in the area 230 covered by the cellular network 200, the cellular network server 210 transmits the disable starter command to the cellular network tower 220 (step 604), the cellular network tower 220 transmits the disable starter command to the electronic apparatus 100 (step 605), and the disable starter command is received by the electronic apparatus 100 (step 606). In this embodiment, the starter circuit 20 is not disabled upon the electronic apparatus' 100 receipt of the disable starter command. Rather, in this embodiment the electronic apparatus 100 puts the disable starter command in an active state (step 607) upon the electronic apparatus 100 receiving the disable starter command. This active state can be accomplished by any means by which the electronic apparatus 100 registers or otherwise stores data indicating that there is a current (non-cancelled or overridden) request to disable the starter, preferably in an area 230 covered by the cellular network. Specifically, the electronic apparatus 100 may store a flag in its internal memory 220 to indicate this active state.

As discussed in detail above, when the disable starter command is received, the vehicle 10 is either in or later enters a parked state (step 608). Upon entering into the parked state at step 608, the electronic apparatus 100 transmits a test signal to the service provider server 300 via the wireless network 200 (step 609). If the test signal is successfully transmitted, the starter circuit 20 is disabled (step 620). The starter circuit 20 will remain disabled until such an enable starter command is received by the electronic apparatus 100. Upon an enable starter command being received by the electronic apparatus 100, the starter circuit can be re-enabled (step 621) so that the user can again use the vehicle 10. Thus, in this embodiment the test signal is sent upon the vehicle 10 entering into the parked state rather than waiting for the user to make an attempt to restart the vehicle as with the embodiment illustrated in the FIG. 2 flow chart and described above.

If the test signal is not successfully sent to the server 300, the starter circuit 20 remains enabled (step 610). The test signal not being successfully sent to the server 300 is indicative of the situation discussed above in which the vehicle 10 is parked in a location that is outside of the area 230 covered by any cellular network. Therefore, as discussed above it is undesirable to disable the starter circuit 20 with the vehicle 10 parked at such location because the vehicle 10 will not be able to be re-enabled, which creates the issues discussed above. In this situation, because the starter circuit 20 remains enabled at step 610, the motor 30 can be started by a user at his or her convenience (step 611). Also in this situation, the disable starter command remains in the active state.

In certain embodiments, the user will be unaware that any attempt to disable the vehicle 10 has been made. However, in other embodiments when the disable starter command is transmitted at step 602, an email, text message, phone call, or the like may be transmitted to the user/owner of the vehicle 10 informing him or her of the attempt to disable the vehicle 10 in order to persuade the user/owner of the vehicle 10 to attempt to remedy the default condition. In certain embodiments it may be undesirable to provide such information to the user/owner of the vehicle 10 if there is a fear that the user may hide the vehicle 10 in a remote location that is not within any area covered by any cellular network. Thus, in certain embodiments the dealer or other person in charge of the dealer workstation 400 may be able to decide whether or not to transmit such information to the user/owner of the vehicle 10. This transmission of an email, text message, phone call or the like is also applicable to the method of FIG. 2.

If at any time the electronic apparatus 100 receives an enable starter command, the starter circuit 20 is re-enabled (step 621) and the disable starter command will no longer be active. Thus, even if the test signal is not successfully sent, the user may realize that he is in default (possibly due to receive of the email, text message, phone call or the like) and may remedy the default, which will result in the workstation 400 transmitting the enable starter command to deactivate the disable starter command and ensure that the vehicle 10 does not become disabled.

However, if the electronic apparatus 100 does not receive an enable starter command, when the motor 30 is subsequently powered off, the vehicle 10 enters a subsequent parked state (step 608). At this stage, the electronic apparatus 100 once again transmits a test signal to the service provider server 300 (step 609) and the above steps are repeated to determine whether the vehicle 10 is in an area 230 with adequate cellular coverage. A test signal can be resent every time the vehicle 10 enters a subsequent parked state so that the loop between steps 608 and 611 will continue until either the starter circuit is disabled at step 620 because the test signal is successfully sent or until an enable starter command is received by the electronic apparatus 100 because the user/owner of the vehicle has remedied the default condition. Upon the electronic apparatus 100 determining that the resent test signal was successfully sent to the service provider server 300, the starter circuit 20 can enter a disabled state (step 620) such that the vehicle 10 is immobilized.

It should be noted that the invention is not limited to the embodiments discussed above. In other embodiments, the apparatus can alternate between different methods of disablement. In one embodiment, the apparatus 100 can be configured to receive different types of disable starter commands associated with different methods of disabling the starter circuit 20. One disable starter command could cause the apparatus 100 to carry out the disablement process described in FIG. 2, where the starter circuit is disabled upon receiving the disable starter command. Another disable starter command could cause the apparatus 100 to carry out the disablement process described in FIG. 3, where the starter circuit 20 is not disabled until a test signal is successfully sent. In alternative embodiments, the invention can use other means sufficient to instruct the apparatus 100 of the type disablement method to use, such as a separate command or an input located on the apparatus 100. Further, the invention can allow a user to choose between additional methods of disablement.

Further, the test signal can be sent at any time during the parked state. For example, the test signal can be sent during an attempt to start the motor 30 as discussed with regard to FIG. 3, the test signal can be sent upon it being determined that the vehicle 10 is in a parked state (such as by being parked or powered off for a predetermined period of time), the test signal can be sent immediately upon the vehicle 10 entering into a parked state, or the test signal can be sent at any other time as desired.

Returning to FIG. 1, the components of the electronic apparatus 100 and its connection to the starter circuit 20 will be further described now that a full description of the system and methods have been discussed above. According to embodiments of the invention, the transceiver 150 is configured to transmit and receive cellular data to and from the electronic apparatus 100, such data including the test signal sent from the electronic apparatus 100 to the service provider server 300 when the vehicle 10 is in a parked state. The invention, however, is not so limited, as the transceiver 150 can be any device that transmits and receives signals, including a modem or transponder. The transceiver 150 can also be configured to receive instructions from the processor 110, including an instruction to send the test signal to the server 300.

The processor 110 is operably coupled to the transceiver 150 and the switching mechanism 120. The switching mechanism 120 is operably coupled to the starter circuit 20 of the vehicle 10 to disable and/or enable the circuit. The processor 110 is configured to instruct the switching mechanism 120 to disable the starter circuit 20 based on receipt of a disable starter command from the service provider server 300. The processor 110 is further configured to instruct the transceiver 150 to send the test signal to the server 300. In one embodiment, the test signal instruction is provided by the processor 110 when the vehicle 10 is in a parked state and the starter circuit 20 is disabled. The processor 110 is further configured to determine whether the test signal was successfully sent to the remote server 300. The test signal can be any type of signal for which a determination of successful transmission can be determined. For example, the test signal can cause an error message to be generated when the signal is not successfully sent. Alternatively, the test signal can be similar to a ping signal that tests the reachability of a host on a network.

In this embodiment, upon determining that the test signal was not successfully sent to the remote server 300, the processor 110 is further configured to instruct the switching mechanism 120 to enable the starter circuit 20. The processor 110 can be any machine for processing data. For example, the processor 110 can be a microprocessor or other central processing unit. The processor 110 can be a single integrated circuit contained on a single chip, or be comprised of a plurality of components, including a plurality of processing components.

In this embodiment, the processor 110 is further configured to, upon determining that the test signal was successfully sent to the server 300, disable the starter circuit 20 of the vehicle 10. The processor 110 is further configured to, (a) upon determining that the test signal was not successfully sent to the remote server 300 during the parked state and the starter circuit 20 of the vehicle 10 is enabled, instruct the transceiver 150 to resend the test signal upon the vehicle 10 entering into a subsequent parked state; and (b) upon the processor 110 determining that the resent test signal was successfully sent to the remote server 300, disable the starter circuit 20 of the vehicle 10.

The electronic apparatus 100 of the exemplified embodiment further comprises the internal memory 140 and the GPS module 130 operably coupled to the processor 110. In certain exemplified embodiments, the memory 140 constitutes a chip for storing data and programs. The invention is not so limited, however, as the memory 140 can be any device for storing data or programs, including a disk. Further, the memory 140 need not form its own device, but can form part of other components. For example, the memory 140 can form part of a processor chip. In the exemplified embodiment, the GPS module 130 utilizes a satellite-based navigation system for providing data regarding the location of the electronic apparatus 100. The invention, however, is not so limited, as the GPS module 130 can be any module configured to provide location data. Utilizing the transceiver 150, the apparatus 100 can send the GPS location data to the server 300 and dealer 400 to enable the repossession of the vehicle.

It should be noted that the commands, messages, and signals referenced herein, can be processed at the different stages set forth above without altering their identity or purpose. For example, the disable starter command sent by the dealer workstation 400 can be received by the service provider server 300 and then processed. This processed command can then be transmitted to the cellular network 200 while still retaining its identity and function as a disable starter command.

Further, the starter circuit 20 can be enabled using a process similar to the disabling process discussed above. In such an embodiment, the dealer workstation 400 sends an enable starter command to the service provider server 300. An enable starter command might be sent for any purpose deemed reasonable by the originator of the command. For example, the owner of the vehicle 10 may have made a car payment that was previously overdue. Alternatively, the enable starter command may be sent to reverse a disable starter command that had been sent in error.

In one embodiment, after receiving the enable starter command, the service provider server 300 processes the command and forwards it to the cellular network server 210. The cellular network server 210 then locates the cellular network tower 220 in contact with the electronic apparatus 100 and transmits the enable starter command to the cellular network tower 220. The cellular network tower 220 then transmits the enable starter command to the electronic apparatus 100 coupled to the starter circuit 20 of the vehicle 10. Next, the electronic apparatus 100 sends an acknowledge message to the dealer workstation 400 confirming receipt of the enable starter command, the acknowledge message utilizing the aforementioned cellular network tower 220, cellular network server 210, and service provider server 300. Next, the electronic apparatus 100 turns off its output terminal, thereby deactivating the switching mechanism 120. Finally, the deactivated switching mechanism 120 enables the starter circuit 20. It should be noted that the various alternative embodiments and features discussed above with regard to the transmission and execution of the disable starter command can also apply to the transmission and execution of the enable starter command.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method for disabling and/or enabling a vehicle, the method comprising:
   a) receiving, with an electronic apparatus, a disable starter command, the electronic apparatus operably coupled to a starter circuit of the vehicle to enable and/or disable the starter circuit;
   b) the electronic apparatus disabling the starter circuit of the vehicle in response to the disable starter command;
   c) the electronic apparatus sending a test signal via a wireless network to a remote server when the vehicle is in a parked state and the starter circuit is disabled; and
   d) upon the electronic apparatus determining that the test signal was not successfully sent to the remote server, the electronic apparatus enabling the starter circuit of the vehicle.

2. The method of claim 1, wherein step d) further comprises upon the electronic apparatus determining that the test signal was successfully sent to the remote server, the electronic apparatus maintaining the disablement of the starter circuit of the vehicle.

3. The method of claim 1, wherein upon the electronic apparatus determining that the test signal was not successfully sent to the remote server during the parked state and the starter circuit of the vehicle is enabled in step d), the electronic apparatus resending the test signal upon the vehicle entering into a subsequent parked state; and wherein upon the electronic apparatus determining that the resent test signal was successfully sent to the remote server, the electronic apparatus disabling the starter circuit of the vehicle.

4. The method of claim 1, wherein the parked state is defined by an ignition of the vehicle being off for a predetermined period of time.

5. The method of claim 1, wherein the electronic apparatus comprises a switching mechanism; and wherein the electronic apparatus disables the starter circuit of the vehicle during step b) by opening the switching mechanism; and wherein the electronic apparatus enables the starter circuit of the vehicle during step d) by closing the switching mechanism.

6. The method of claim 5, wherein the switching mechanism comprises a relay.

7. The method of claim 1, wherein step c) is initiated by an attempt to start the vehicle.

8. The method of claim 1, wherein upon the electronic apparatus having received the disable starter command and the disable starter command is in an active state, the electronic apparatus performs step c) every time there is an attempt to start the vehicle; and upon the electronic apparatus determining that the test signal was successfully sent to the remote server, the electronic apparatus disabling the starter circuit of the vehicle.

9. The method of claim 1, wherein the electronic apparatus further comprises a global positioning system (GPS) module operably coupled to a processor, the GPS module configured to determine the location of the vehicle.

10. A method for disabling and/or enabling a vehicle, the method comprising:
   a) receiving, with an electronic apparatus, a disable starter command, the electronic apparatus operably coupled to a starter circuit of the vehicle to enable and/or disable the starter circuit;
   b) the electronic apparatus sending a test signal to a remote server via a wireless network when the vehicle is in a parked state, the test signal sent subsequent to the receipt of the disable starter command; and
   c) upon the electronic apparatus determining that the test signal was not successfully sent to the remote server, the starter circuit remaining in or being returned to an enabled state.

11. The method of claim 10, wherein step c) further comprises upon the electronic apparatus determining that the test signal was successfully sent to the remote server, the starter circuit entering or remaining in a disabled state.

12. The method of claim 10, wherein upon the electronic apparatus determining that the test signal was not successfully sent to the remote server during the parked state and the starter circuit of the vehicle remaining in or being returned to the enabled state, the electronic apparatus resending the test signal upon the vehicle entering into a subsequent parked state; and wherein upon the electronic apparatus determining that the resent test signal was successfully sent to the remote server, the starter circuit remaining in or entering a disabled state.

13. The method of claim 10, wherein the parked state is defined by an ignition of the vehicle being off for a predetermined period of time.

14. The method of claim 10, wherein the electronic apparatus comprises a relay, the relay being coupled to the starter circuit of the vehicle to enable and/or disable the starter circuit.

15. The method of claim 10, wherein step b) is initiated by an attempt to start the vehicle.

16. The method of claim 10, wherein upon the electronic apparatus having received the disable starter command and the disable starter command is in an active state, the electronic apparatus performs step b) every time the vehicle enters a subsequent parked state; and upon the electronic apparatus determining that the test signal was successfully sent to the remote server, the starter circuit entering a disabled state.

17. The method of claim 10, wherein the electronic apparatus further comprises a global positioning system (GPS) module operably coupled to a processor, the GPS module configured to determine the location of the vehicle.

18. An electronic apparatus for disabling and/or enabling a vehicle, the apparatus comprising:
   a switching mechanism configured (a) to operably couple to a starter circuit of the vehicle and (b) to disable and enable the starter circuit;
   a transceiver configured to receive wireless command signals from a remote server; and
   a processor operably coupled to the switching mechanism and the transceiver, the processor configured to:
      instruct the switching mechanism to disable the starter circuit based on receipt of a starter disable command from the remote server,
      instruct the transceiver to send a test signal to the remote server when the vehicle is in a parked state and the starter circuit is disabled;
      determine whether the test signal was successfully sent to the remote server; and
      upon determining that the test signal was not successfully sent to the remote server, instruct the switching mechanism to enable the starter circuit.

19. The apparatus of claim 18, wherein the processor is further configured to, upon determining that the test signal was successfully sent to the remote server, maintain the disablement of the starter circuit of the vehicle.

20. The apparatus of claim 18, wherein the processor is further configured to:
   upon determining that the test signal was not successfully sent to the remote server during the parked state and the starter circuit of the vehicle is enabled, instruct the transceiver to resend the test signal upon the vehicle entering into a subsequent parked state; and
   upon the processor determining that the resent test signal was successfully sent to the remote server, disable the starter circuit of the vehicle.

* * * * *